US012669792B2

(12) United States Patent
Martin

(10) Patent No.: US 12,669,792 B2
(45) Date of Patent: Jun. 30, 2026

(54) EXCHANGING OF A PROGRAMMABLE LOGIC CONTROLLER

(71) Applicant: Siemens Mobility GmbH, Munich (DE)

(72) Inventor: Maximilian Martin, Buttenheim (DE)

(73) Assignee: Siemens Mobility GmbH, Munich (DE)

( * ) Notice: Subject to any disclaimer, the term of this patent is extended or adjusted under 35 U.S.C. 154(b) by 385 days.

(21) Appl. No.: 18/557,662

(22) PCT Filed: Mar. 28, 2022

(86) PCT No.: PCT/EP2022/058068
§ 371 (c)(1),
(2) Date: Oct. 27, 2023

(87) PCT Pub. No.: WO2022/228797
PCT Pub. Date: Nov. 3, 2022

(65) Prior Publication Data
US 2024/0219882 A1 Jul. 4, 2024

(30) Foreign Application Priority Data
Apr. 27, 2021 (DE) ..................... 10 2021 204 165.5

(51) Int. Cl.
*G05B 19/05* (2006.01)
(52) U.S. Cl.
CPC .... *G05B 19/052* (2013.01); *G05B 2219/1208* (2013.01); *G05B 2219/1209* (2013.01)
(58) Field of Classification Search
CPC .......... G05B 19/052; G05B 2219/1208; G05B 2219/1209; H04L 12/40195; H04L 12/40; H04L 2012/4026; H04L 12/40169
See application file for complete search history.

(56) References Cited

U.S. PATENT DOCUMENTS

| | | | |
|---|---|---|---|
| 11,316,654 B2 | 4/2022 | Weichlein | |
| 2003/0033030 A1 | 2/2003 | Naismith et al. | |

FOREIGN PATENT DOCUMENTS

| | | | | |
|---|---|---|---|---|
| CN | 108551397 A | * | 9/2018 | ........... H04L 12/462 |
| DE | 202016007423 U1 | | 3/2018 | |
| EP | 3674824 A1 | | 7/2020 | |

OTHER PUBLICATIONS

English Translation of "CN-108551397-A" (Year: 2018).*

* cited by examiner

*Primary Examiner* — Charles R Kasenge
(74) *Attorney, Agent, or Firm* — Laurence A. Greenberg; Werner H. Stemer; Ralph E. Locher

(57) ABSTRACT

A method is provided for exchanging a first programmable logic controller which performs a control function by running through a process cycle including multiple successive process steps. Provision is made for the first programmable logic controller and a further programmable logic controller as network subscribers of a network. Data are transferred between network subscribers of the network in accordance with a communication cycle defined in a communication scheme and including successive time intervals. The communication cycle is additionally synchronized with the process cycle such that transfer information is output to the further programmable logic controller by the first programmable logic controller during a time interval of a first kind of the communication cycle. After the transfer information has been read in by the further programmable logic controller, the control function is performed by the further programmable logic controller instead of the first programmable logic controller.

13 Claims, 2 Drawing Sheets

EXCHANGING OF A PROGRAMMABLE LOGIC CONTROLLER

FIELD AND BACKGROUND OF THE INVENTION

The invention relates to a method for exchanging a programmable logic controller, a device for carrying out the method, a computer program product and a computer-readable medium.

Complex and/or automated processes are commonly controlled by means of a programmable logic controller. Conventionally, for the exchange of such a programmable logic controller, for example, for the purpose of a servicing, the controlled process must be stopped and re-started after an exchange of the programmable logic controller. An interruption of this type of the controlled process leads to significant down times and can thereby result in significant costs. Alternatively, the possibility has conventionally existed of passing a control function of the programmable logic controller that is to be exchanged to a further programmable logic controller in that two programmable logic controllers are provided in a network with a fixed physical topology. In order to prevent a time-consuming interruption of the controlled process, a ring topology or a topology with special signal connections between the two programmable logic controllers can, for example, be provided as a physical topology. Although it is possible in this way to prevent a significant interruption of the process to be controlled when a programmable logic controller is exchanged, it nevertheless necessitates the selection of a predetermined physical network topology.

SUMMARY OF THE INVENTION

It is therefore an object of the invention to provide an improved method for exchanging a programmable logic controller in which the exchange can be realized in a favorable manner in respect of effort and time efficiency. This object is achieved by a method having the features described below.

It is a further object of the invention to provide a device for carrying out the method according to the invention. This object is achieved by a device having the features of the independent device claim.

It is a further object of the invention to provide a computer program product for carrying out the method according to the invention with the device according to the invention. This object is achieved by a computer program product having the features of the independent computer program product claim.

It is a further object of the invention to provide a computer-readable medium on which the computer program product is stored. This object is achieved by means of a computer-readable medium described below.

Advantageous developments of the present invention are disclosed in the dependent subclaims.

In the method according to the invention, data is transmitted between different network subscribers of a network in accordance with a communication cycle which consists of successive time intervals and is specified in a communication scheme. In particular, the data is transmitted in a time-controlled manner. Preferably, for this purpose, time settings of the network subscribers are synchronously matched to one another according to a common clock signal. This can be realized, for example, by means of a so-called Precision Time Protocol (PTP) which is known to a person skilled in the art. During at least one time interval of the communication cycle, predetermined network subscribers are each authorized either for sending or for receiving the data. The communication cycle can be realized, for example, on the basis of a time-multiplex method. The time-multiplex method is also known as Time Division Multiple Access (TDMA). Preferably, the time-multiplex method is a synchronous time multiplex method. Time intervals of fixed duration are provided in the synchronous time multiplex method. During the intervals mentioned, in each case, predetermined network subscribers are authorized to send data and other predetermined network subscribers are authorized to receive data. In this way, communication in a network can easily be separated physically. Furthermore, in this way a convergence can be achieved in a favorable manner in respect of effort under different physical network topologies.

It is also conceivable that the data is transmitted according to a secured transmission protocol. This can be, for example, a transmission protocol according to the standard IEC 61784-3. In this way, an integrity of the transmitted data can be ensured. In addition, safety requirements that are placed upon the transmission of data in a network can easily be observed.

In a further advantageous embodiment, the data is transmitted between different network subscribers in accordance with a "publish/subscribe" protocol. For this purpose, the data can be transmitted according to the standard OPC UA PubSub. In this way, the sender can dispense with an explicit addressing of the data to one or more receivers. In this way, the data can be transmitted in a favorable manner in respect of effort by one or more senders to one or more receivers unknown to the senders.

Preferably, during a time interval of the communication cycle, at least two predetermined network subscribers are authorized for the transmission of data. Particularly preferably, at least one of the at least two predetermined network subscribers is authorized in this time interval to send and at least one further of the at least two network subscribers is authorized to receive. In this way, a reliable data transmission from a sender to a receiver can be enabled.

Furthermore, in the method according to the invention, a first programmable logic controller and a further programmable logic controller can be provided as network subscribers of the network. Herein, the programmable logic controller can be a modular programmable logic controller, a compact programmable logic controller or a special form of a programmable logic controller (PLC) known to a person skilled in the art, such as for example, a soft-PLC in which a PLC software item is executed on a PC. In the method according to the invention, a control function is carried out by the first programmable logic controller. For this purpose, the first programmable logic controller runs through a process cycle consisting of a plurality of successive process steps. In each of the process steps, at least a portion of the data is either read in, processed or output. In particular, the process cycle herein represents a basic structure which follows the input-processing-output principle. An order of the individual process steps can therein be arbitrary.

In addition, in the method according to the invention, the communication cycle is synchronized with the process cycle such that during a temporal run-through of the process cycle, a predetermined process step of the process cycle is carried out during a time interval of the communication cycle that is associated with this predetermined process step. Preferably, a predetermined process step of the process cycle is carried out completely during the time interval of the communication cycle associated with this predetermined process step. This enables an association of a transmission of data between predetermined network subscribers and predetermined process steps of the process cycle that is favorable in respect of effort.

Furthermore, in the method according to the invention, during a time interval of the first type of the communication cycle, the first programmable logic controller is authorized to send data and the further programmable logic controller is authorized to receive this data. During the time interval of the first type, a handover information item is output by the first programmable logic controller. This handover information item is thereupon read in during the time interval of the first type by the further programmable logic controller. Following the reading-in of the handover information item, the control function is carried out by the further programmable logic controller rather than by the first programmable logic controller.

The method according to the invention thus enables a handover that is favorable in respect of effort of a control function by the first programmable logic controller to the further programmable logic controller independently of a physical topology of the network. Additionally, in this manner, an interruption of the control function can easily be prevented. Dropout times due to an interruption of the control function and a restart, following the exchange, of the process to be controlled can thereby be avoided.

An advantageous development provides that, as at least a portion of the handover information item, a status indicator is output, on the basis of which an impending handover of the control function is indicated. In this way, a data quantity for indicating the handover can be kept small.

In a further advantageous development, it is provided that process state data is acquired and stored by the first programmable logic controller during the run-through of the process cycle. The expression process state data should be understood in the present context to mean data which has information regarding a progression, a state and/or a state transition of a process driven by means of the exercise of the control function. For example, the process state data can comprise information regarding a state and/or a state transition of a network subscriber of the network that is driven by the programmable logic controller. By means of the process state data, a progression, a state and/or a state transition of a process to be controlled which deviates from a neutral starting state can be acquired. If this process state data of a programmable logic controller taking over a control function of the process to be controlled is not available, then this means that a restart of the process to be controlled beginning from the neutral starting state may be required in order to achieve a reliable control of the process to be controlled. This process state data stored by the first programmable logic controller is output as at least one further portion of the handover information item. In this way, on the basis of the handover information item, the further programmable logic controller can reliably take over and continue a control function from the first programmable logic controller. Successive process steps of the process cycle can then be run through by the further programmable logic controller rather than by the first programmable logic controller. A restart of the process to be controlled can be dispensed with. This also has the result that a rapid handover of the control function between the programmable logic controllers is enabled. It is also conceivable that the handover information item comprises an information item regarding a provided handover time point.

In an advantageous embodiment variant, it is proposed that the process cycle is run through multiple times by the first programmable logic controller. Preferably, in this advantageous embodiment, the communication cycle is run through multiple times. Particularly preferably, the communication cycle is run through multiple times synchronized with the process cycle such that during each run-through of the process cycle, a predetermined process step of the process cycle is carried out during a time interval of the communication cycle that is associated with this predetermined process step. In this way, a reliable control function can be provided.

In a further advantageous embodiment variant, it is provided that process state data is acquired and stored by the first programmable logic controller during each run-through of the process cycle. In this way, current process state data is always available for transfer to the further programmable logic controller. It is herein conceivable that during each run-through of the process cycle, the process state data is output to the further programmable logic controller. Thus, even in the event of an unforeseen dropout of the first programmable logic controller, a control function can be continued by the further programmable logic controller.

Furthermore, an advantageous development provides that during a time interval of the second type of the communication cycle, at least one network subscriber of the first type of the network is authorized to send input data. Furthermore, in the time interval of the second type of the communication cycle, the first programmable logic controller and/or the further programmable logic controller is authorized to receive this input data. Furthermore, during the time interval of the second type, this input data is read in by the first programmable logic controller and/or the further programmable logic controller. An identification of a particular programmable logic controller as the receiver of the input data can thus be dispensed with. In this way, the input data can be received simultaneously by an arbitrary number of programmable logic controllers that are unknown to the senders of the data. This enables any arbitrary programmable logic controller to be replaced by another programmable logic controller in a manner that is favorable in respect of effort. As the network subscriber of the first type, for example, a sensor can be provided. By means of such a sensor, input data can be output to further network subscribers, in particular to the first programmable logic controller and/or the further programmable logic controller, during the time interval of the second type. The sensor can be a sensor already known to a person skilled in the art, such as a temperature sensor, a pressure sensor or a touch sensor.

In a further advantageous development, it is provided that during a time interval of the third type of the communication cycle, the input data is processed into an output dataset by the first programmable logic controller and/or the further programmable logic controller by means, in each case, of a deterministic data processing program, dependent upon the process state data. The expression deterministic data processing program should be understood in the present context to be a program which, on repeated execution, starting from the same input data and the same process state data, always calculates the same output dataset. Possible deviations between the calculated output datasets can be caused in this case purely by hardware-related errors. During the time interval of the third kind, a data transmission between further network subscribers can thus be enabled. A time efficiency of a data flow can therefore be optimized. Preferably, the input data from the further programmable logic controller can be processed by means of the same deterministic data processing program by means of which the first programmable logic controller also processes the input data.

Furthermore, an advantageous development provides that during a time interval of the fourth type of the communication cycle, at least one network subscriber of the second type is authorized to receive data. In addition, during the time interval of the fourth type, either the first programmable logic controller or the further programmable logic controller is authorized to send data. Furthermore, it is herein provided that during this time interval of the fourth type, the at least one network subscriber of the second type firstly reads in a portion of the output dataset. In this way, by means of the communication scheme, an output of the output dataset to network subscribers of the second type can be realized independently of an identity of the programmable logic controller.

An advantageous embodiment variant provides that the at least one network subscriber of the second type is driven by means of at least a portion of the output dataset. A network subscriber of the second type can be, for example, an actuator. This actuator can be an arbitrary actuator already known to a person skilled in the art. For example, the actuator can be an electromechanical actuator or a hydraulic or pneumatic actuator. In this way, a control function can be carried out independently of an identity of the programmable logic controller. This enables a control function carried out by the first programmable logic controller to be continued without interruption by the further programmable logic controller following receipt of the handover information item.

Furthermore, a further advantageous development provides that in the event of multiple run-throughs of the process cycle by the first programmable logic controller, the control function is carried out after the reading-in of the handover information item beginning with a start time point of a process cycle by the further programmable logic controller rather than by the first programmable logic controller. This makes it possible for a process cycle begun by the first programmable logic controller to be ended by this first programmable logic controller. A process cycle can thus be run through from the beginning by the further programmable logic controller. Preferably, an immediately subsequent process cycle is run through by the further programmable logic controller rather than by the first programmable logic controller. By this means, a particularly rapid handover can be enabled.

Furthermore, an advantageous further development provides that in the event of multiple run-throughs of the process cycle by the first programmable logic controller, after the reading-in of the handover information item, the same process cycle is run through by the further programmable logic controller rather than by the first programmable logic controller. Since the same process cycle is run through, the same process steps are carried out in the same order of the process cycle by the further programmable logic controller rather than by the first programmable logic controller. In this way, an established control function can be maintained independently of an exchange of the programmable logic controller.

The method according to the invention can be carried out by means of the device according to the invention.

The device according to the invention has a plurality of network subscribers interconnected in a network. In particular, the device has the network subscribers described above which are each configured to realize the features described in the respective context with the corresponding network subscriber. Data can be transmitted between the different network subscribers of the network in accordance with a communication cycle consisting of successive time intervals specified in a communication scheme. Herein, the communication scheme and the communication cycle are, in particular, the communication scheme described in relation to the method and the communication cycle described in relation to the method. During at least one time interval of the communication cycle, predetermined network subscribers are each able to be authorized either for sending or for receiving the data. Furthermore, the device according to the invention has a first programmable logic controller and a further programmable logic controller as network subscribers. For this purpose, the first programmable logic controller is configured to carry out a control function by means of a run-through of a process cycle consisting of a plurality of successive process steps. Furthermore, the first programmable logic controller is configured firstly either to read in, to process or to output a portion of the data in a plurality of successive process steps. The process cycle and the associated process steps are, in particular the process cycle described in relation to the method and the process steps described in relation to the method. In addition, the communication cycle is synchronized with the process cycle such that during a temporal run-through of the process cycle, a predetermined process step of the process cycle can be carried out during a time interval of the communication cycle that is associated with this predetermined process step. Furthermore, the further programmable logic controller is herein configured, after the reading-in of a handover information item output during a time interval of the first type by the first programmable logic controller, to carry out the control function rather than the first programmable logic controller.

In this way, a network can be provided with network subscribers that can be interchanged and/or added and/or removed flexibly. In this manner, an exchange of individual network subscribers can take place favorably in respect of effort and without any interruption of the control function.

In an advantageous development, it is provided that at least one network subscriber of the second type can be activated by the first programmable logic controller and by the further programmable logic controller by means of the network. This enables a simple interchangeability of a programmable logic controller which is configured to carry out a control function.

By means of the computer program product according to the invention, the device according to the invention can be caused to carry out the method according to the invention.

The computer program product according to the invention is stored on the computer-readable medium according to the invention.

The above-described properties, features and advantages of the invention and the manner in which these are achieved will now be described more clearly in relation to the following description of the exemplary embodiment of the invention making reference to the drawings. Where suitable, the same reference characters are used for the same or corresponding elements of the invention in the figures. The exemplary embodiment serves to explain the invention and does not limit the invention to the combinations of features given therein, also not in relation to functional features. In addition, all the features given in the exemplary embodiment can be considered in isolation and suitably combined with the features of any desired claim.

DETAILED DESCRIPTION OF THE INVENTION

Figure 1:
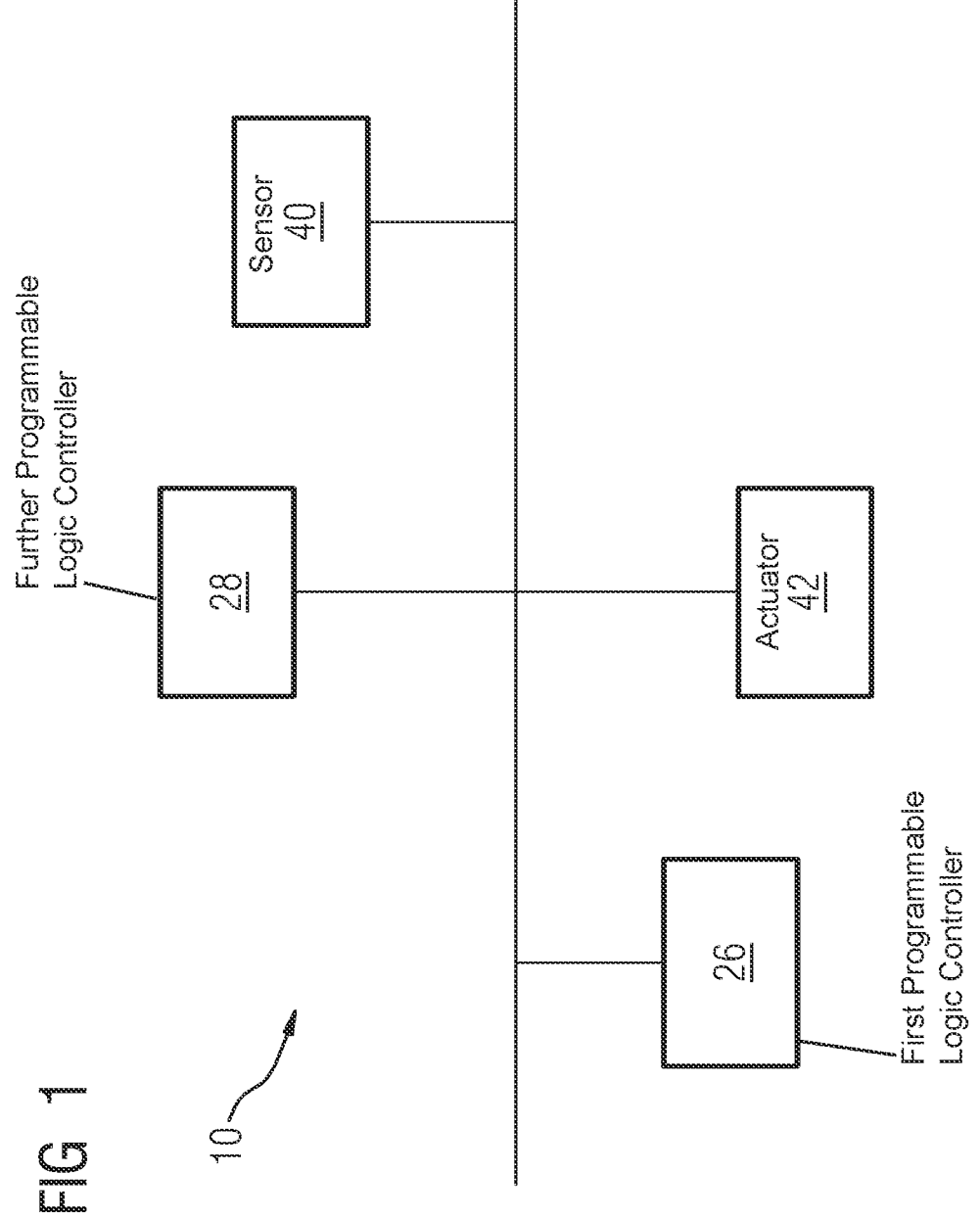
FIG. 1 shows a schematic representation of an exemplary embodiment of a device according to the invention.

FIG. 1 shows a logical topology of a network 10 in a schematic representation. For the description of the following exemplary embodiment, the network 10 has four interconnected network subscribers. In principle, the network 10 can, in practice, have any number of further network subscribers. For the sake of clarity, a description of the following exemplary embodiment below is made on the basis of four network subscribers. A number of network subscribers is geared in practice to the requirements of a process that is to be controlled. For example, the network has, as network subscribers, a first programmable logic controller 26 and a further programmable logic controller 28. Furthermore, the network 10 has, for example, a sensor 40 and an actuator 42.

Figure 2:
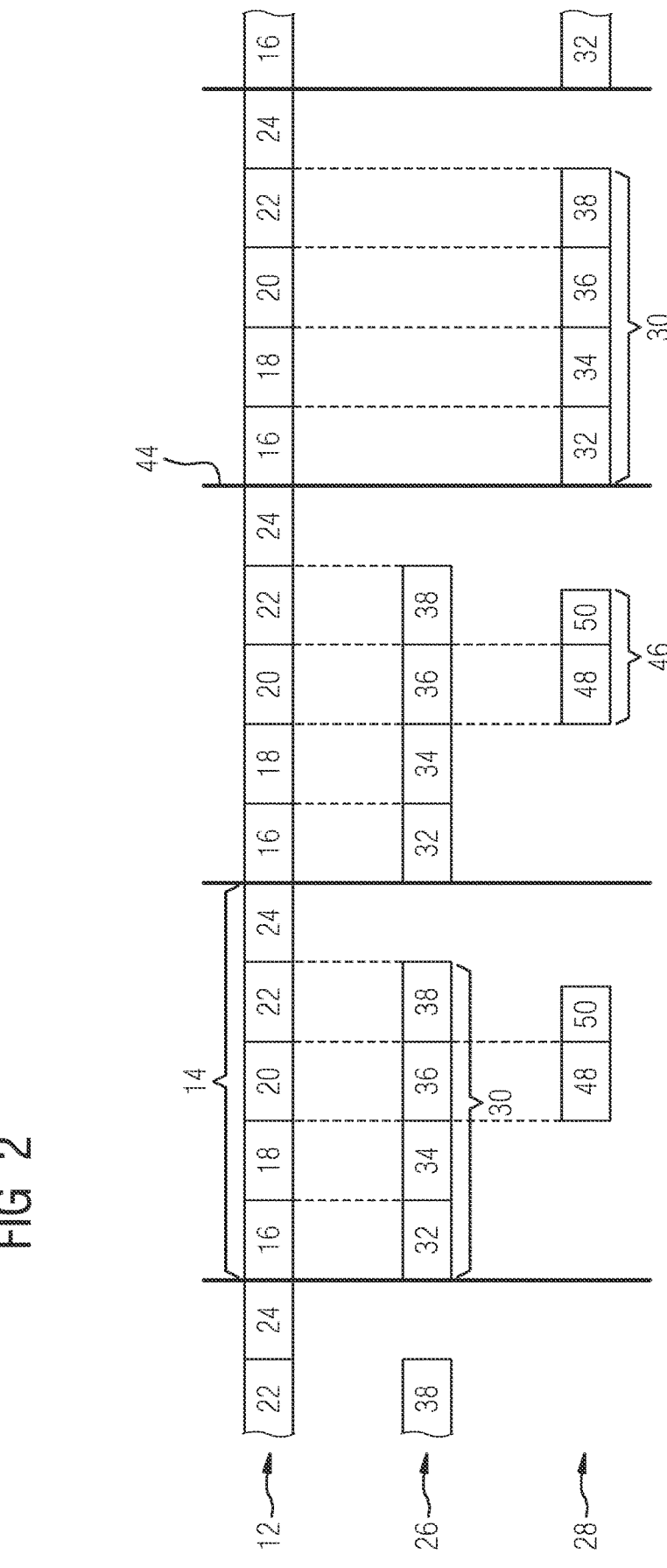
FIG. 2 shows an illustration of a temporal run-through of an exemplary embodiment of the method according to the invention.

Data can be transmitted between the network subscribers of the network 10 in accordance with a communication cycle 14 specified in a communication scheme 12. The communication cycle 14 is illustrated in FIG. 2 and is realized in the present exemplary embodiment according to a synchronous time multiplex method. This can be implemented, for example, by means of the IEEE 802.1Qbv standard. For this purpose, time settings of the network subscribers are synchronously matched to one another according to a common clock signal. The time settings of the network subscribers can be matched to one another, for example, by means of a so-called Precision Time Protocol (PTP). Furthermore, the transmission of the data between the network subscribers takes place, in the present exemplary embodiment, on the basis of a publish/subscribe protocol. For example, for this purpose, the standard OPC UA PubSub can be used as a publish/subscribe protocol. In addition, in the present exemplary embodiment, the data is transmitted between the network subscribers in accordance with a secured transmission protocol. The communication cycle 14 consists, in the present exemplary embodiment, of five successive time intervals 16, 18, 20, 22, 24. During the time intervals 16, 18, 20, 22, 24, predetermined network subscribers of the network 10 are each able to be authorized either for sending or for receiving the data.

The first programmable logic controller 26 is configured to carry out a control function by means of a run-through of a first process cycle 30. For this purpose, the first programmable logic controller 26 is configured either to read in, to process or to output at least a portion of the data, respectively in a plurality of successive process steps 32, 34, 36, 38 of the first process cycle 30. In addition, by means of the further programmable logic controller 28, the control function can be carried out. In order to carry out the control function, the sensor 40 is designed to acquire actual state data of a process (not shown in detail) that is to be controlled. This process that is to be controlled can involve any desired industrial and/or automated process. For example, it can involve a control of a system, for example, a ventilation system for a tunnel or a control of a machine. The actuator 42 is designed to receive target state data of the process to be controlled. On the basis of this target state data, in the present exemplary embodiment, the process to be controlled is transferred by means of the actuator 42 from an actual state to a target state. Thus, the control function is carried out by means of the first programmable logic controller 26 in that, in the successive process steps 32, 34, 36, 38 of the first process cycle 30, the actual state data is read in, this actual state data is processed to target state data on the basis of a deterministic data processing program in connection with process state data of the process to be controlled, and thereafter the target state data is output. In this way, the actuator 42 is able to be activated by means of the first programmable logic controller 26.

FIG. 2 illustrates a temporal run-through of an exemplary embodiment of a method for exchanging the first programmable logic controller 26. In this illustrated exemplary embodiment, the first programmable logic controller 26 initially runs through the first process cycle 30 multiple times. The first process cycle 30 herein consists of four successive process steps 32, 34, 36, 38. In a first process step 32 of the first process cycle 30, input data is read in by the first programmable logic controller 26. In a second process step 34 of the first process cycle 30, the read-in input data is processed by the first programmable logic controller 26 by means of a deterministic data processing program dependent upon process state data to an output dataset. In the present exemplary embodiment, the process state data contains information regarding a state and/or a state transition of the actuator 42. It is further conceivable that the process state data contains information regarding a progression, a state and/or a state transition of the process that is to be controlled. A state of the actuator 42 can be amended by means of an activation on the basis of the output dataset. In addition, in the second process step 34, the process state data is acquired and stored by means of the first programmable logic controller 26. In a first process step 36 of the first process cycle 30, a handover information item is output by the first programmable logic controller 26. On the basis of the handover information item, an impending handover of the control function can be indicated and/or the process state data can be transmitted by the first programmable logic controller 26. In a fourth and last process step 38 of the first process cycle 30, the output data set calculated in the second process step 34 is output.

The communication cycle 14 specified in the communication scheme 12 consists, in the present exemplary embodiment, of five successive time intervals 16, 18, 20, 22, 24. The communication cycle 14 is synchronized with the first process cycle 30 such that during a temporal run-through of the communication cycle 14, each process step 32, 34, 36, 38 of the first process cycle 30 is carried out completely during a time interval 16, 18, 20, 22 of the communication cycle 14 associated with this respective process step 32, 34, 36, 38.

The first process step 32 of the first process cycle 30 is carried out completely during a first time interval 16 of the communication cycle 14. During the first time interval 16, the first programmable logic controller 26 is authorized to receive data. Furthermore, during the first time interval 16, the sensor 40 is authorized to send data.

In this way, during the first time interval 16, input data in the form of actual state data of the process to be controlled is transferred from the sensor 40 to the first programmable logic controller 26. Furthermore, during a second time interval 18 of the communication cycle 14, the second process step 34 of the first process cycle 30 is carried out completely. During the second time interval 18, the input data is processed to an output dataset by the first programmable logic controller 26 by means of a deterministic data processing program dependent upon the process state data. Subsequently, during a third time interval 20 of the communication cycle 14, the third process step 36 is carried out completely. During the first time interval 20, the first programmable logic controller 26 is authorized to receive data.

In the present exemplary embodiment, during the third time interval 20, the handover information item is output by the first programmable logic controller 26 and thereupon is read in by the further programmable logic controller 28. During each run-through of the first process cycle 30, the process state data stored by the first programmable logic controller 26 is therein output as a portion of the handover information item during the third time interval 20. In addition, a status indicator is output by the programmable logic controller 26 during the third time interval 20 as a further portion of the handover information item. An impending handover of the control function can be indicated by the status indicator. In the present exemplary embodiment, the further programmable logic controller 28 runs through a further process cycle 46 consisting of two process steps 48, 50 for reading in and processing the handover information item. It is conceivable herein that the further process cycle 46 can comprise further process steps. In the present exemplary embodiment, the further process cycle 46 is run through multiple times by the further programmable logic controller 28. The further process cycle 46 consists of a first further process step 48 in which the further programmable logic controller 28 reads in data, and a second further process step 50 in which the further programmable logic controller 28 evaluates and stores the read-in data. For reading in the handover information item, the further programmable logic controller 28 is authorized to receive data during the third time interval 20. In addition for this purpose, the further process cycle 46 is synchronized with the communication cycle 14 such that the first further process step 48 is carried out completely during the third time interval 20. This enables the status indicator contained within the handover information item to be evaluated by the further programmable logic controller 28 in the second further process step 50.

During a fourth time interval 22 of the communication cycle 14, the fourth process step 38 is carried out completely. During the fourth time interval 22, the first programmable logic controller 26 is authorized to send data and the actuator 42 is authorized to receive the data. Herein, the output dataset is transferred to the actuator 42 in the form of target state data. In this way, the actuator 42 is driven by means of the target state data and an actual state of the actuator 42 is then transferred into a target state. Accordingly, by means of the actuator 42, the process to be controlled is transferred from the actual state previously acquired by the sensor 40 into a target state. Finally, the communication cycle 14 comprises a fifth time interval 24 which is not assigned to any process step of the first process cycle 30 or the further process cycle 46. During the fifth time interval 24, possible further network subscribers (not disclosed in detail) of the network 10 are enabled to send or receive data.

In the present exemplary embodiment, the handover information item is output by the first programmable logic controller 26 during each run-through of the first process cycle 30 in the third process step 36. With the status indicator, in the present exemplary embodiment, either an impending handover is indicated or it is indicated that no handover of the control function is impending. As soon as a status indicator is output during a run-through of the first process cycle 30, on the basis of which an impending handover of the control function is indicated, the control function is carried out, starting at a start time point 44 of a first process cycle 30 immediately following this first process cycle 30, by the further programmable logic controller 28 rather than by the first programmable logic controller 26. In this way, the first process cycle 30 begun by the first programmable logic controller 26 in which an impending handover of the control function has been indicated by means of the status indicator is ended by the first programmable logic controller 26. Beginning with the start time point 44 of an immediately following first process cycle 30, the process steps 32, 34, 36, 38 are run through by the further programmable logic controller 28 rather than by the first programmable logic controller 26. In addition, with the taking over of the control function at the start time point 44, the authorization for the transmission of data during the communication cycle 14 previously allocated in the communication scheme 12 of the first programmable logic controller 26 is immediately allocated to the further programmable logic controller 28. In this way, the control function of the first programmable logic controller 26 is handed over from the start time point 44 in a time-efficient and interruption-free manner to the further programmable logic controller 28. A function of the first programmable logic controller 26 is therefore entirely replaced by a function of the further programmable logic controller 28. Thereupon, the first programmable logic controller 26 can be removed from the network 10. Furthermore, beginning with the start time point 44, the first process cycle 30 will be run through multiple times by the further programmable logic controller 28 rather than by the first programmable logic controller 26.

Although the invention has been illustrated and described by way of the exemplary embodiment described, the invention is not restricted by the examples disclosed and other variations can be derived herefrom by a person skilled in the art without departing from the protective scope of the invention.

The invention claimed is:

1. A method for exchanging a programmable logic controller, the method comprising:

transmitting data between different network subscribers of a network in accordance with a communication cycle formed of successive time intervals and specified in a communication scheme;

during at least one time interval of the communication cycle, authorizing each of a plurality of predetermined network subscribers of the network either for sending or for receiving the data;

providing a first programmable logic controller and a further programmable logic controller as network subscribers of the network;

using the first programmable logic controller to carry out a control function by running through a process cycle formed of a plurality of successive process steps;

in each of the process steps, either reading in, processing or outputting at least a portion of the data;

synchronizing the communication cycle with the process cycle such that during a temporal run-through of the process cycle, a predetermined process step of the process cycle is carried out during a time interval of the communication cycle associated with the predetermined process step;

during a time interval of a first type of the communication cycle, authorizing the first programmable logic controller to send data and authorizing the further programmable logic controller to receive the sent data;

during the time interval of the first type, using the first programmable logic controller to output a handover information item and using the further programmable logic controller to read in the handover information item; and following the reading-in of the handover information item, using the further programmable logic controller, rather than the first programmable logic controller, to carry out the control function.

2. The method according to claim 1, which further comprises outputting a status indicator as at least a portion of the handover information item, and indicating an impending handover of the control function based on the status indicator.

3. The method according to claim 1, which further comprises:

using the first programmable logic controller to acquire and store process state data during the run-through of the process cycle; and outputting the process state data stored by the first programmable logic controller as at least one further portion of the handover information item.

4. The method according to claim 3, which further comprises:

using the first programmable logic controller to run through the process cycle multiple times; and using the first programmable logic controller to acquire and store the process state data during each run-through of the process cycle.

5. The method according to claim 1, which further comprises:

during a time interval of a second type of the communication cycle, authorizing at least one network subscriber of the first type of the network to send input data and authorizing at least one of the first programmable logic controller or the further programmable logic controller to receive the sent data; and during the time interval of the second type, using at least one of the first programmable logic controller or the further programmable logic controller to read in the sent data.

6. The method according to claim 5, which further comprises during a time interval of a third type of the communication cycle, using at least one of the first programmable logic controller or the further programmable logic controller to process the input data into an output dataset by using a respective deterministic data processing program, dependent upon the process state data.

7. The method according to claim 6, which further comprises:

during a time interval of a fourth type of the communication cycle, authorizing at least one network subscriber of the second type to receive data and authorizing either the first programmable logic controller or the further programmable logic controller to send data; and during the time interval of the fourth type, using the at least one network subscriber of the second type to read in at least a portion of the output dataset.

8. The method according to claim 7, which further comprises driving the at least one network subscriber of the second type by at least a portion of the output dataset.

9. The method according to claim 1, which further comprises:

using the first programmable logic controller to run through the process cycle multiple times; and following the reading-in of the handover information item, using the further programmable logic controller, rather than the first programmable logic controller, to carry out the control function out beginning at a start time point of a process cycle.

10. The method according to claim 1, which further comprises:

using the first programmable logic controller to run through the process cycle multiple times; and following the reading-in of the handover information item, using the further programmable logic controller, rather than the first programmable logic controller, to run through the same process cycle.

11. A device for exchanging a programmable logic controller, the device comprising:

a plurality of network subscribers interconnected in a network;

different network subscribers of said network being configured to transmit data therebetween in accordance with a communication cycle formed of successive time intervals and specified in a communication scheme;

predetermined network subscribers of said network each being configured to be authorized either for sending or for receiving the data during at least one time interval of said communication cycle;

a first programmable logic controller and a further programmable logic controller being provided as network subscribers;

said first programmable logic controller being configured to carry out a control function by a run-through of a process cycle formed of a plurality of successive process steps;

said first programmable logic controller being configured either to read in, to process or to output at least a portion of the data, respectively in said plurality of successive process steps;

said communication cycle being synchronized with said process cycle such that during a temporal run-through of said process cycle, a predetermined process step of the process cycle is configured to be executed during a time interval of said communication cycle associated with said predetermined process step; and said further programmable logic controller being configured, after reading-in of a handover information item output during a time interval of a first type by said first programmable logic controller, to carry out said control function rather than said first programmable logic controller.

12. The device according to claim 11, which further comprises at least one network subscriber of a second type being configured to be activated by said first programmable logic controller and by said further programmable logic controller by using said network.

13. A non-transitory computer readable medium having commands stored thereon which cause a device according to claim 11 to carry out a method for exchanging a programmable logic controller having the following steps:

transmitting data between different network subscribers of a network in accordance with a communication cycle formed of successive time intervals and specified in a communication scheme;

during at least one time interval of the communication cycle, authorizing each of a plurality of predetermined network subscribers of the network either for sending or for receiving the data;

providing a first programmable logic controller and a further programmable logic controller as network subscribers of the network;

using the first programmable logic controller to carry out a control function by running through a process cycle formed of a plurality of successive process steps;

in each of the process steps, either reading in, processing or outputting at least a portion of the data;

synchronizing the communication cycle with the process cycle such that during a temporal run-through of the process cycle, a predetermined process step of the process cycle is carried out during a time interval of the communication cycle associated with the predetermined process step;

during a time interval of a first type of the communication cycle, authorizing the first programmable logic controller to send data and authorizing the further programmable logic controller to receive the sent data;

during the time interval of the first type, using the first programmable logic controller to output a handover information item and using the further programmable logic controller to read in the handover information item; and following the reading-in of the handover information item, using the further programmable logic controller, rather than the first programmable logic controller, to carry out the control function.

\* \* \* \* \*